July 7, 1942.  R. R. RIDGWAY  2,289,211
TITANIUM OXIDE COMPOSITION
Filed May 24, 1939
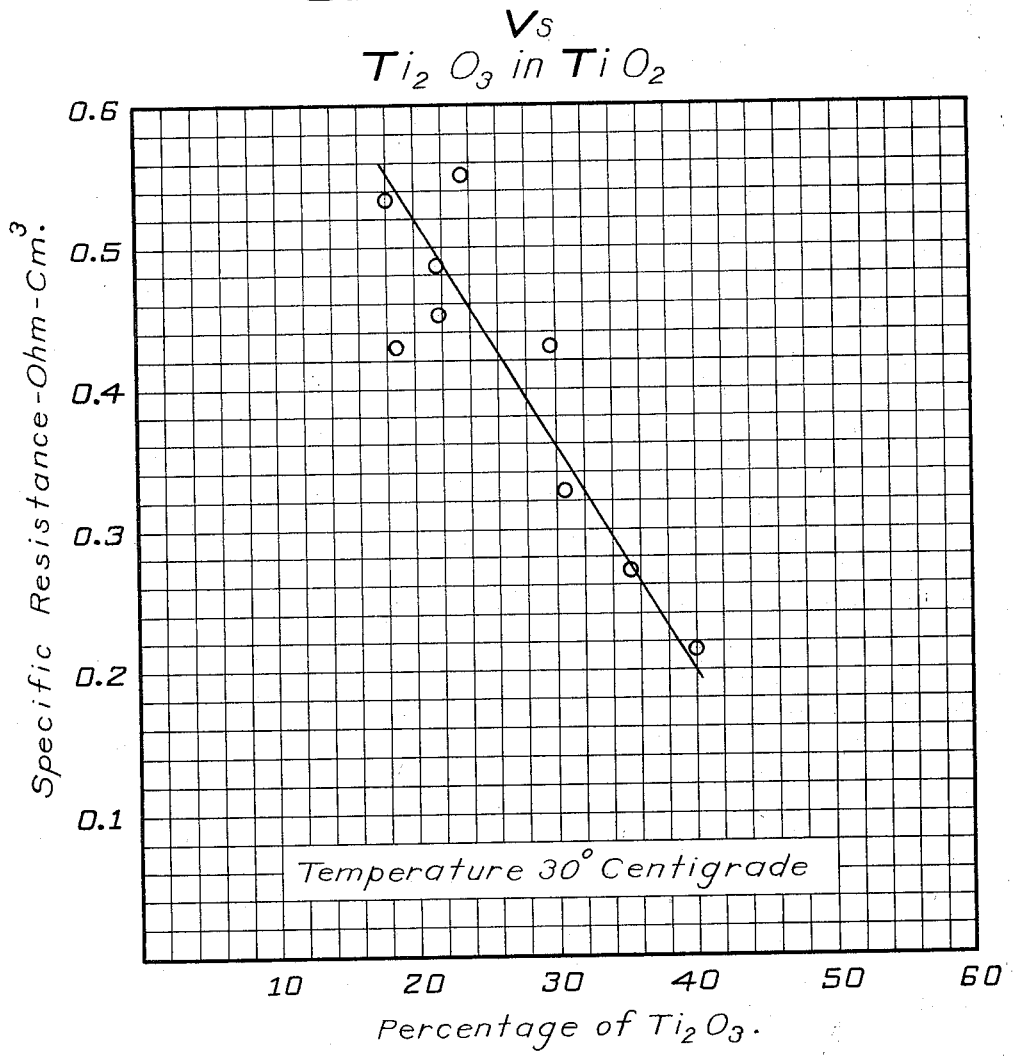
Circles Indicate Actual Tests
of Specific Compositions
Inventor
RAYMOND R. RIDGWAY
By George ~~~~~~
Attorney Patented July 7, 1942

2,289,211

UNITED STATES PATENT OFFICE 2,289,211

TITANIUM OXIDE COMPOSITION

Raymond R. Ridgway, Niagara Falls, N. Y., assignor to Norton Company, Worcester, Mass., a corporation of Massachusetts Application May 24, 1939, Serial No. 275,365

4 Claims. (Cl. 201—76)

The invention relates to electrical resistances formed primarily of titanium oxide and to methods of manufacture thereof.

One object of the invention is to provide a material for the manufacture of resistor rods for electric furnaces. Another object of the invention is to provide electric resistances of long life and good electrical properties. Another object of the invention is to provide refractory oxide resistor material having a relatively small negative temperature coefficient. Another object of the invention is to provide a refractory oxide resistor material which may be mixed with other refractory oxides to produce a material suitable for electric resistor rods for high power furnaces.

Another object of the invention is to provide a crystalline titanium oxide material in massive durable form which is electrically conductive. Another object of the invention is to reduce partially, but not completely, $TiO_2$ to a composition empirically a $TiO_2$ plus $Ti_2O_3$ mixture. Another object of the invention is to provide a practical and commercial method for producing a $TiO_2$ plus $Ti_2O_3$ mixture of electrical properties suitable for various types of electrical resistances.

Another object of the invention is to provide a refractory conductor consisting essentially of self-bonded oxides which will hold its electrical conductive properties without deterioration. Another object of the invention is to provide fused titanium oxides in the form of an ingot of self-bonded crystals having maximum density. Another object of the invention is the production of a refractory oxide melt which can be poured or cast into the form of shaped articles which are electrically conductive at room temperatures. Another object of the invention is to provide a chemically inert and stable form of crystalline titanium oxide including $Ti_2O_3$ suitable for use in the ceramic resistor art. Other objects will be in part obvious or in part pointed out hereinafter.

The invention accordingly consists in the combinations of elements, molecular and crystalline structure, and in the several steps and arrangement and order of each of said steps to one or more of the others thereof, as will be exemplified in the product and method to be hereinafter described, and the scope of the application of which will be indicated in the following claims.

In the accompanying drawing illustrating the electrical properties of certain embodiments of the invention, the single figure is a graph showing resistivity at room temperature of mixtures of $TiO_2 + Ti_2O_3$, the abscissa representing the percentage of $Ti_2O_3$, and the ordinate representing resistivity in ohms per centimeter cubed, the circles indicating actual tests of specific compositions and the line being a conclusion from those tests.

As conducive to a clearer understanding of the present invention, in the various natural minerals titanium oxide exists substantially solely or principally in the compound whose empirical formula is $TiO_2$, or at least I know of no natural mineral having the composition $Ti_2O_3$. Titanium oxide in nature may be intermixed or chemically combined with oxides of one or more other elements. A common form of titanium dioxide is the mineral known as rutile. The natural minerals of or containing $TiO_2$ are not suited for many industrial purposes because of the presence of undesired elements and because of the lack of suitable physical and chemical characteristics. In particular, they and also purified $TiO_2$ are not conductive enough for most electrical uses, and in particular are not suitable for electric resistor rods for furnaces.

I may use as a starting material, for the production of compositions and products according to the present invention, purified titanium dioxide, $TiO_2$. This is an article of commerce and is produced by the chemical processing of rutile or ilmenite involving the solution of the mineral in chemical reagents and reprecipitation of the dissolved $TiO_2$ in purified form. I preferably select a grade of $TiO_2$ comprising approximately 99% $TiO_2$ and I prefer that it have as much as 1% $SiO_2$ as this constituent favorably affects the physical structure of our final products. Commercial ceramic grade $TiO_2$ ordinarily has this much $SiO_2$ and I analyze samples to ascertain that my starting product contains such amount of silica. Preferably also my starting material has no more than a trace of any iron oxide, and the aforesaid commercial ceramic grade $TiO_2$ fills this specification. My starting material comes in the form of a light, fluffy, amorphous powder having a low apparent density and is comparatively free from moisture, having been calcined. I prefer a well calcined product.

I provide any suitable open top electric arc furnace such, for example, as a Higgins type furnace as disclosed in United States Reissue Patent No. 13,027 to Aldus C. Higgins, but preferably I provide a tilting furnace in order to be able to pour the molten charge. This furnace preferably has graphite electrodes and any suitable type of regulating mechanism. Any known size of furnace is suitable for carrying out the present invention.

I charge this furnace with my starting material of $TiO_2$. In a typical run using a furnace of total capacity of fifty pounds, when the power was maintained at from 60 to 75 kilowatts and the furnace voltage was 50 volts between the electrodes, the furnace feed rate was six-tenths of a kilowatt hour per pound of feed and the total run was completed in thirty minutes.

After the entire batch is thus fused, the fusing temperature being around 1650° C., I pour the melt into molds of any description to form blocks, rods, tubes, bars, or bricks. These are then allowed to cool and I may if desired accelerate or retard the cooling in any suitable manner. Rods, bars, tubes, or like articles may be used for various types of electrical resistances; but the partially reduced titania is especially useful as a starting material for making resistor rods of mixed refractory oxide material. To that end the crystalline mass is preferably crushed to a grain or powder and placed along with other refractory oxides, for example alumina, zirconia, or silica or mixtures thereof, in an electric furnace and re-fused and useful objects such as bars, tubes, or rods cast from the re-fused material. I have found that there is a material difference between mixing various other refractory oxides with amorphous titanium oxide material, on the one hand, and mixing said other refractory oxide materials with the crystalline titanium oxide material which is the subject of this invention. The compositions of matter, methods and articles involved in making mixed refractory oxide resistors of titanium oxides and other refractory oxides are the subject of my copending application Serial No. 275,366, filed May 24, 1939, this application being more especially directed to the titanium oxide material which may be used as such for electrical purposes or may be used as a starting material for the production of the aforesaid mixed oxide refractory materials.

As a result of fusing the starting material herein used, namely chemically precipitated $TiO_2$, in an open top electric arc furnace, there is produced a mixture of titanium oxides probably consisting mainly of $TiO_2$ and the remainder empirically identified as $Ti_2O_3$. The reduction is caused by the graphite electrodes, but this reduces only part of the $TiO_2$ to the suboxide represented by $Ti_2O_3$ and when carried out in the manner indicated does not reduce any substantial part of the starting material to the metallic form. With the rate of power input indicated, the product will correspond to an analysis of about 85% $TiO_2$ and 15% $Ti_2O_3$. By using an open top electric arc furnace with graphite electrodes, there is produced an atmosphere of carbon monoxide on top of the melt formed by the burning of the electrodes, and yet this is not pure nor is the atmospheric air so completely excluded that the reduction will go to an extreme extent. This fusion of titanium oxides in the percentage as indicated, when cooled is a fairly coarse crystalline material having a dense black appearance and a conchoidal fracture and it is a conductor of electricity, its conductivity being along the order of that of poorly bonded carbon, carbonaceous materials, and the like.

Substantially pure $TiO_2$ has a resistivity of about 11,730 ohms to the cm.$^3$. This compares with the 85% $TiO_2$ and 15% $Ti_2O_3$ mixture of 340,000 micro-ohms to the cm.$^3$. In other words, roughly the pure titanium dioxide is 35,000 times less conductive or has 35,000 times the resistance of the mixture according to this present invention.

I could produce more $Ti_2O_3$ and the invention is not to be deemed limited to any particular percentage. On the other hand, the mixture indicated is conductive enough so that in order to produce a bar of sufficient resistance it has to be fairly small in diameter and of considerable length and for that reason one of the principal uses for material of the present invention is as a starting material to mix with other refractory oxides such as alumina which will reduce the conductivity, at the same time increasing the strength. I prefer to produce a product having a substantial percentage of reduced $Ti_2O_3$, such as the 15% indicated, because this can then be mixed with alumina to make a resistor which will be stronger than if I had used a titanium oxide mixture with, for example, only 1% or 2% of $Ti_2O_3$. Therefore, in the preferred form of the invention, the reduction is carried on to approximately the extent indicated, avoiding complete reduction, on the one hand, or reduction of only a very small amount, on the other hand.

My material has a negative temperature coefficient of resistivity, but not an extreme one, and for ceramic materials it has in fact a moderate negative coefficient. Consequently, it is possible to embody a resistor rod of characteristics which can be readily controlled in the operation of an electric furnace using the material of the present invention.

One important feature of the material of the present invention is that it has a high melting point, melting at approximately 1650° C., and, therefore, is particularly adapted for high temperature electric furnaces.

Another important feature of the mixed titanium oxide is that it is highly fluid in a molten condition and can be cast into intricate shapes which will sharply define the form of the original mold. Also, when mixed with silica, alumina, or zirconia or mixtures of these, the fluidity is increased, at a given temperature, at the same time without lowering the melting point substantially, that is to say, the titanium oxides are refractory materials.

Certain advantages are obtained by the incorporation of minor amounts of these other oxides in the $TiO_2$ melt. I have found that the crystallinity of the casting consisting of the $Ti_2O_3$ and $TiO_2$ cast oxide is quite variable, depending upon the temperature at which it is cast and the minor amounts of impurities contained therein. For example, titanium oxide casting is made with a superheated liquid from the furnace, and the crystals of the casting grow to such a large extent that the resultant shape is weak mechanically and not very resistant to spalling. I have found that when silica is incorporated in the melt, the grain structure is refined and a smoother, denser casting results.

Explaining why in the formation of an ultimate material including, for example $Al_2O_3$, $TiO_2$ and $Ti_2O_3$, I find it advantageous to proceed as herein indicated, namely, fusing the titanium oxide material twice, I find that titanium oxide which is fused only once and then cast oftentimes is porous and has pipes and blow holes destroying the uniformity of the castings. This tendency is greatly reduced by a re-fusion of the titanium oxide.

Regarding the percentages of the various ingredients, my starting material preferably comprises at least 95% $TiO_2$ with no more than .5% of any iron oxide and desirably with at least .5% of another or other refractory oxides selected from the group consisting of zirconia, alumina, and silica, nor more than 5% of such other refractory oxides. The conductive fused titanium oxide preferably comprises at least 5% $Ti_2O_3$ and not more than 50% thereof, and at least 50% $TiO_2$ and not more than 95% thereof, and not more than 5% of other refractory oxides selected from the group consisting of zirconia, alumina and silica.

Another use for the material of the present invention is to coat silicon carbide abrasive grains with a conductive coating which improves their characteristics for granular type lightning arrestors.

It will thus be seen that there has been provided by this invention a composition of matter and a method in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. An electrical resistance composed of at least 95% by weight of crystalline titania having from 50 to 95% of titanium dioxide and 5 to 50% of a lower titanium oxide and containing not over 5% by weight of other substances, said mass having an intergrown crystalline structure formed by crystallization of said titanium oxides and associated substances from an interfusion thereof.

2. An electrical resistance formed as a prefused, intergrown crystalline mass, of which at least 95% by weight is composed of titania crystals containing from 80 to 95% of $TiO_2$ and from 5 to 20% of a lower oxide represented empirically by the formula $Ti_2O_3$, the balance of said mass being other refractory metal oxides in crystalline form.

3. An electrical resistance formed of 95 to 99.5% by weight of titania and from 0.5 to 5% of a material selected from the group consisting of alumina, silica and zirconia and mixtures thereof, said titania being composed of from 50 to 95% of $TiO_2$ and from 5 to 50% of a reduction product empirically represented by the formula $Ti_2O_3$, the resistance being formed of intergrown crystals of said oxides crystallized from a fused mixture thereof.

4. An electrical resistance formed of self-bonded material composed of 95 to 99.5% by weight of titania and 0.5 to 5.0% of a material selected from the group consisting of the oxides of silicon, aluminum and zirconium and mixtures thereof, the titania being composed of 80 to 95% of $TiO_2$ and 5 to 20% of a lower oxide represented empirically by the formula $Ti_2O_3$, the resistance being a dense, coherent, shaped mass of intergrown crystals of said oxides crystallized in its final shape from a fused mixture thereof.

RAYMOND R. RIDGWAY.